Oct. 22, 1963 G. L. CLAPPER 3,108,228

DELAY COMPENSATION BY DISTRIBUTED SYNCHRONOUS PULSES

Filed Dec. 18, 1961 2 Sheets-Sheet 1

INVENTOR
GENUNG L. CLAPPER
BY John C Black
ATTORNEY

3,108,228
DELAY COMPENSATION BY DISTRIBUTED SYNCHRONOUS PULSES

Genung L. Clapper, Vestal, N.Y., assignor to International Business Machines Corporation, New York, N.Y., a corporation of New York Filed Dec. 18, 1961, Ser. No. 160,053
8 Claims. (Cl. 328—72)

This invention relates to an improved method and means compensating for an unavoidable delay in one part of an electrical system by introducing a "negative delay" in another part of the system.

The unavoidable inherent delays in certain parts of electrical information handling equipment give rise to timing problems especially where there is the requirement for coincidence of an information signal with a reference pulse. This has become a particularly critical problem with the advent of high speed equipment in the last decade, a prime example being the reduction in arithmetic calculating times in digital processing systems to fractions of a microsecond.

These unavoidable delays place a severe limitation on the maximum frequency at which calculations can be performed.

It is therefore a primary object of the present invention to provide a relatively simplified and inexpensive method and means substantially compensating for an unavoidable delay in a part of an electrical system. This object is achieved in the preferred embodiment by introducing a "negative delay" in another part of the system.

The term "negative delay" is used in sense of providing a system condition prior to the time at which the condition would normally occur in the system.

A specific example of an environment in which the present invention is particularly useful is a high speed computer wherein a digital adder introduces an inherent delay between its input and output signals. In computers which operate at synchronizing or reference pulse frequencies in the order of one megacycle, typical known adders will frequently introduce a delay which is greater than half the reference pulse width. Reliable operation of the computer cannot be assured with a delay of this magnitude unless means are provided to assure resynchronization of the output signal.

One obvious alternative is a reduction in the operating frequency to a value at which the fixed adder delay is a relatively small proportion of the reference pulse width. A second known alternative, which will be discussed in greater detail later, is the provision of an additional delay in the adder output which when combined with the inherent adder delay equals the reference pulse width. This latter alternative, however, requires special circuitry and a special synchronous timing pulse; and, as in the first alternative, the frequency of operation is reduced substantially.

Accordingly, it is a more specific object of the present invention to provide an improved method and means compensating for the inherent time delay in an adder without requiring a reduction in the operating frequency. This object is achieved in the preferred embodiment by providing a multistage shift register which receives digital information to be supplied to the adder and which advances the information to the adder with a negative time delay which substantially compensates for the adder delay. Preferably, the negative delay is produced by introducing cumulative incremental negative delays in the application of the synchronizing or shift pulse to each register stage from the first to the last stage respectively. Since it is the total of the shift register interstage negative delays which compensate for the adder delay, the incremental interstage delay values are not critical and relatively inexpensive passive delay means may be utilized.

Further, it has been found that utilizing the negative incremental shift pulse delays from the first to the last stage in a shift register to compensate for adder delay improves register reliability and frequently obviates the need for a delay circuit between the output of each register stage and the input of the next succeeding stage. These features are due primarily to that fact that the negative shift pulse delays permit the setting of a bit in one stage to lag the trailing edge of the shift pulse applied to the succeeding stage and to permit overlapping of this bit and the next succeeding shift pulse applied to the succeeding stage. This negative interstage shift pulse delay also permits more reliable register operation at substantially higher frequencies, especially in registers designed for operation in the megacycle range and above.

Accordingly, it is an object of the present invention to provide a more reliable and/or more economical shift register.

It is a further object of the present invention to assure reliable shift register operation at higher frequencies.

A feature of the present invention is the sequential rather than coincident operation of the shift register stages which effects a more uniform power consumption and minimizes problems of crosstalk noise, ground loops, power supply regulation and the like.

The foregoing and other objects, features and advantages of the invention will be apparent from the following more particular description of a preferred embodiment of the invention, as illustrated in the accompanying drawings.

Figure 1:
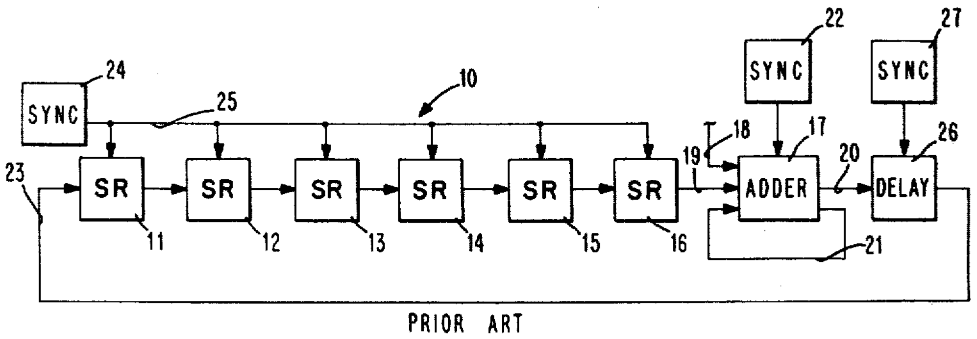
FIG. 1 illustrates a known apparatus which compensates for inherent delay in a ring adder.
Figure 2:
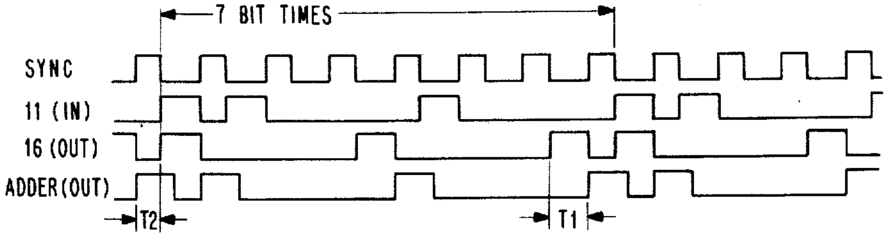
FIG. 2 is a graphical illustration showing the time relationship of certain of the signals in the apparatus of FIG. 1.

FIGS. 1 and 2 illustrate a frequently used technique for resynchronizing a ring adder output signal before it is introduced into the first stage of a shift register associated with the adder. Thus, a conventional shift register 10 including six stages 11–16 is connected to an adder 17 which may be of any known construction, for example that shown in United States Patent No. 2,885,149, issued May 5, 1959 to G. L. Clapper.

The adder includes the usual addend input 18, augend input 19, sum output 20, and carry circuit 21. A source of adder control or reference pulses is shown at 22. The output of the adder is connected to a register input 23, and the register output is connected to the augend input 19. A source of synchronizing or shift pulses 24 is connected to the register by a common line 25.

A delay device 26 is interposed between the sum output 20 and the register input 23, and a source of synchronizing pulses 27 is provided for the delay device.

Merely by way of example, it will be assumed that the adder is operated in serial fashion. To obtain the sum of a series of binary numbers, the first number in the series is applied in serial fashion to the addend input 18 to the adder; and, with the adder output 20 connected to the shift register input 23, the first number will be read serially into the shift register. In a commercial embodiment, of course, means (not shown) would be provided for reading the first number directly into the register. The shift register output is connected to the augend input 19 of the adder, and the first number is transferred from the shift register to the adder coincident with the application of the second number in the series to the addend input for computation of the sum of the two numbers by the adder as described in the abovesaid patent. This sum is then stored in the shift register preparatory to its addition with the next number in the series. This sequence of operations is repeated until the sum of all the numbers in the series is obtained.

With reference to FIG. 2, it will be seen that seven bit times or seven synchronous pulse widths are required to control one cycle of operation of the adder and the register 10, i.e. one more than the number of register stages. The synchronous pulses are shown as positive potential values and the "0" and "1" binary digits or bits are shown as zero and positive potential values respectively. It will be noted that the "1" digits are shifted into the first and last stages 11 and 16 on the trailing edges of the synchronous pulses and are shifted out of the stages on the leading edges of the synchronous pulses in the conventional manner. Only the input to stage 11, the output of stage 16, and the adder output are shown in relation to the synchronous shift pulses. The waveforms for the intermediate stages 12–15 are not shown, the input and output signals of each succeeding stage being delayed with respect to the input and output signals of the preceding stage by one synchronous timing interval.

A train of pulses representative of the binary number 010011 is illustrated as the input to stage 11. The pulse order (from left to right) is reversed with respect to the digit order in accordance with the conventional practice of introducing the digits of a number into an adder in order from the lowest to the highest denominational values. For ease of illustration, it is assumed for FIG. 2 that this binary number is being shifted cyclically through the shift register and adder, no other number being added to it.

The train of pulses appearing at the input of stage 11 is delayed a total of six synchronous pulse timing intervals as it passes through the register. The adder causes an additional delay T1 which is shown as an interval somewhat greater than one-half of a timing interval. If this adder output were applied to the input of stage 11, reliable operation could not be obtained. To obviate this condition, the well known expedient of providing the delay device 26 to introduce an additional resynchronizing time delay T2 is used, where T1 plus T2 equals the timing interval. However, as indicated above the speed of operation is decreased due to the use of seven instead of six bit timing intervals for one cycle of adder operation. In addition, the time delay T2 requires the provision of additional circuitry, i.e. the special delay circuit 26 and the special synchronizing pulse source 27.

The above detailed description is directed solely to a known technique for solving the unavoidable delay problem. The improved method and apparatus of the present invention will be described presently with respect to FIGS. 3 and 4.

This preferred embodiment of the improved apparatus includes a shift register 40 having six serially connected stages 41–46. A source of synchronizing or shift pulses 47 is preferably conected directly to the last stage 46 and to stages 45, 44, 43, 42 and first stage 41 by means of serially connected delay elements 48–52 and taps 53–57. The delay elements may comprise a single passive delay line with appropriate taps. It is readily apparent from FIG. 3 that each shift pulse is received at stage 45 slightly after it is received at stage 46, is received at stage 44 slightly after it is received at stage 45 and so on.

Considering this delay in another sense, it is seen that there is a negative delay in the application of a shift pulse to succeeding stages from the register input to output. Thus stage 42 having a bit stored therein will be restored to its normal empty state by a shift pulse slightly before stage 41 having a bit stored therein is restored to its normal state by the same shift pulse delayed in time; and, further, each of the stages 43, 44, 45 and 46 are similarly reset prior to the reset of the next preceding stage. Hence, the concept of a cumulative negative delay introduced between the shift register input and output is realized; and, as will be seen below, this idea may be utilized to its fullest advantage in simplifying the solution to unavoidable delay in adders and other electrical system components.

The output of the shift register 40, or more specifically the output of its last stage 46, is connected to the augend input 60 of an adder 61. The adder may be of the type described above with respect to FIG. 1. The adder includes an addend input 62 and a carry circuit 63. A source of reference or timing pulses 64 is connected to the adder, and the sum output 65 of the adder is connected directly to the shift register input, i.e. the input 66 of the first stage 41. A binary number source 67 is connected to the addend input 62 by way of a shift register 40A similar to register 40.

Figure 4:
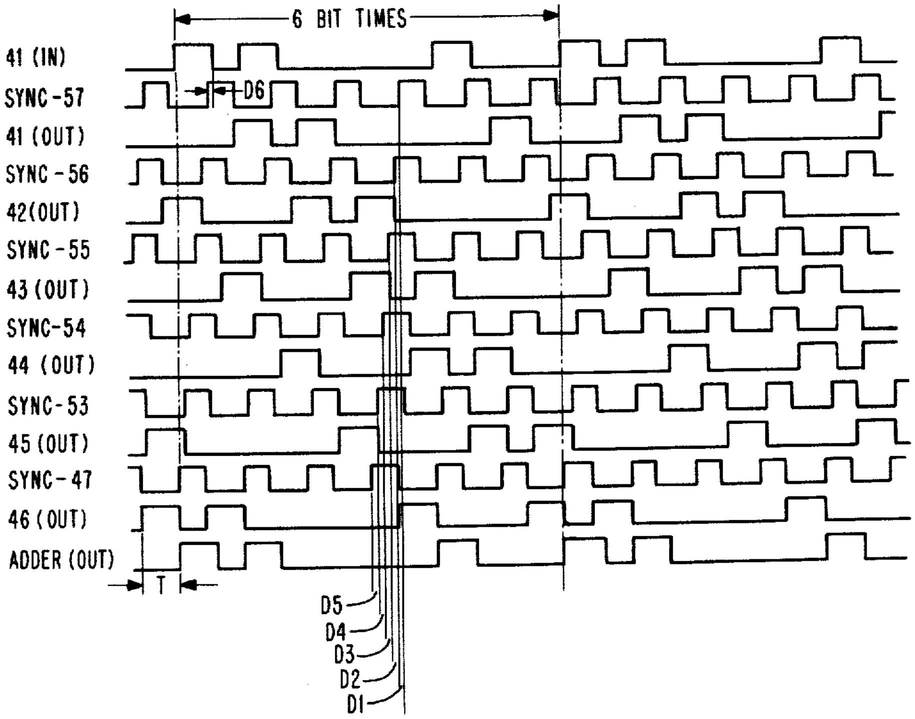
FIG. 4 is a graphical illustration showing the time relationship of certain of the signals in the apparatus of FIG. 3.

FIG. 4 shows the waveforms for the various synchronizing or shift pulses, for the input of the first stage 41 and the adder output both of which are coincident, and for the outputs of each of the stages 41–46. As in FIG. 2, the synchronizing pulses are shown as positive potentials; and the "0" and "1" binary bits are shown as zero and positive potentials, respectively. The negative delays between the synchronizing pulses appearing at taps 57—56, 56—54, 54—54, 54—53 and 53—47 are assigned reference characters D1, D2, D3, D4 and D5, respectively. An additional negative delay between the shift pulse 57 and the adder output signal to stage 41 is indicated at D6. It will be noted that a complete register-adder cycle of operation requires only six synchronizing pulse timing intervals, i.e. one for each register stage, and that the adder output signals are properly synchronized for application to the register input.

Preferably, the negative delays D1–D6 are each equal to one-sixth of the adder delay indicated at T; however, the exact equality of the individual negative delays is not critical so long as the total negative delay substantially equals the adder delay T. A conventional tapped delay line comprising passive components may be utilized to control the shift pulse delay timing. When shift register design has progressed to the point where commercially feasible registers can be operated at higher frequencies, e.g. 20 megacycles and above, it will be possible frequently to design the shift register packaging so that the inherent delay or "skew" of the shift pulse cabling and the "skew" of plug-in printed circuit connections of the register stages will provide the desired negative inter-stage delays to improve shift register performance and reliability and so substantially compensate for positive delays in other parts of a system.

In this regard, attention is directed to the improved performance and reliability which can be achieved in the shift register itself by use of the negative delays in the shift pulse from stage to stage as described above. In multi-stage registers using conventional "Eccles-Jordan" flip-flop circuits, special interstage delay circuits are utilized to issure proper operation of the register. These interstage delay circuits can be eliminated by using the more simplified negative delay means of the present invention, taking care of adjust the shift pulse timing from each stage to its preceding stage to a desired value.

In other shift registers which employ delay circuits as an integral part of each stage, reliability will be improved by providing an overlapping relationship between the shift pulse and input signal to a stage in accordance with the teachings of the present invention. This is particularly important where system design does not prevent occasional occurrence of the input signal slightly in advance of its normal occurrence, which premature occurrence can result in an error unless the negative interstage shift pulse technique of the present invention is used. More specifically, if in FIG. 1 the common line 25 caused a slight delay between the application of a shift pulse to stage 11 and its application to stage 12 this positive delay could be of sufficient duration to prevent the transfer of a "1" bit from stage 11 to stage 12 especially at higher operating frequencies in the megacycle range. However, in FIG. 3, this delay appears as a negative delay and does not prevent the bit transfer. Also the overlapping relation of the input signal to a stage and its shift pulse assure coincidence of the input and shift pulses even though the input pulse is advanced slightly, thereby to prevent the loss of a "1" bit in its transfer from stage to stage.

In addition, the positive delay between an input signal to a stage and the preceding shift pulse applied to that stage permits adequate time for diode recovery in the stage, thereby preventing undue register loading which frequently occurs when sufficient recovery intervals are not assured.

Figure 3:
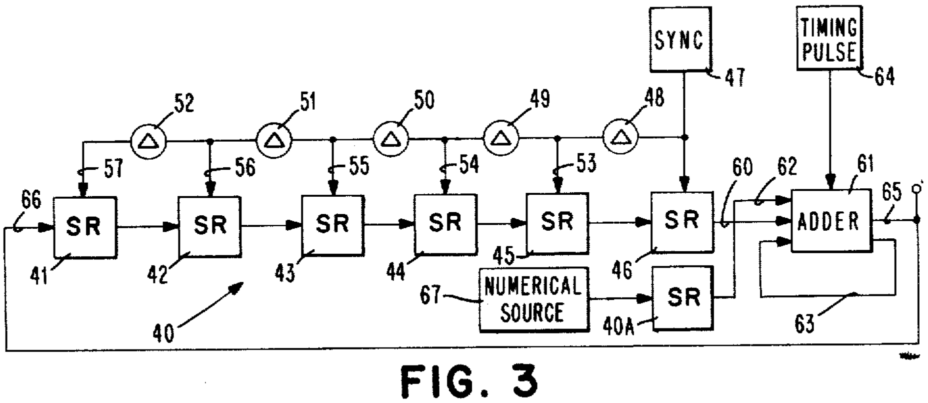
FIG. 3 illustrates the improved method and apparatus of a preferred embodiment of the present invention.

The apparatus of FIG. 3, which is presented merely as one preferred embodiment, may be operated as a serial adder as described with respect to the apparatus of FIG. 1. It will be appreciated, however, that the invention may be similarly utilized in systems in which an adder or other device having unavoidable delay has a parallel input. In this instance, succeeding stages of the register store corresponding bits of succeeding characters and a register is provided for each of the corresponding bits of the characters in the usual manner.

The operation of the improved apparatus of FIG. 3 in a system such as a computer, requires consideration of the relationship of its timing with that of the computer generally. Usually, it will be desirable that the sum output of the adder be fixed in time with respect to sum utilization circuits (not shown) which have a synchronized timing control. Thus, the instant in time at which each signal appears at the output 65 of the adder will be chosen arbitrarily as time "zero" which assures reliable utilization of the signal.

The instant in time at which the source 47 applies each shift pulse to the last register stage 46 is selected as time "zero" minus the adder delay T, whereby a "1" bit shifted from the stage 46 is received at the sum output 65 at time "zero," neglecting for the moment to possible coincident occurrence of a "1" bit at the addend input 62 or the carry input. This bit is applied to the register input 66; and, during the next six shift pulse intervals is advanced through the register and adder. From the preceding description, it will be apparent that as the bit progresses through the register 40, its occurrence relative to time "zero" is progressively advanced until it appears at the augend input 60 at time "zero" minus the adder delay T and again at the adder output 65 at time "zero."

The adder operation requires that addend bit signals applied to the input 62 and the carry signals appear in coincidence with signals at the input 60. The carry signal presents no problem because it is formed by a preceding adder computation and one full pulse time interval is available to apply it to the carry input. Thus the usual carry circuit may be used. Signals at the source 67, however, may be available at some instant in time later than time "zero" minus T. A shift register 40A similar to register 40 may be provided to introduce negative delay into the signals to assure their coincidence with the signals at input 60. Register 40A may require fewer stages than register 40 since it need not store a full binary number. Frequently, the source of signals 67 is a shift register in which event the negative delay is introduced in source 67 so that its output signal occurs at the desired instant in time; and register 40A is not required.

In the commercial utilization of the improved apparatus, the first number in a series of binary numbers to be added will frequently be introduced with proper timing directly into the shift register or directed into the augend input.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. The method of advancing digital information in a shift register having a plurality of serially connected stages comprising
   (*a*) the step of applying a shift pulse to each of the stages with a progressive delay in time from the last to the first of said stages respectively.

2. The method of advancing digital information in an electrical system having a device producing unavoidable delay in signals advanced therethrough and having a shift register with a plurality of serially connected stages, the first of which stages receives the information and the last of which stages is connected to the device to advance the information thereto, said method comprising
   (*a*) the step of applying a shift pulse to each stage with a progressive delay in time from the last to the first of said stages respectively to substantially compensate for the delay in said device.

3. In an electrical storage device having a shift register with a plurality of serially connected stages for storing binary coded bits and having a signal circuit connected to each stage for advancing the coded bits from stage to stage, the improvement comprising
   (*a*) a shift pulse timing means in the signal circuit controlling the application of bit advancing pulses to the stages in order from the first to the last with a negative time delay.

4. An electrical storage device comprising
   (*a*) a shift register having a plurality of serially connected stages for storing binary coded bits,
   (*b*) a signal circuit connected to each stage for advancing the coded bits from stage to stage,
   (*c*) electrical delay means interposed in the signal circuit between each of the stages,
   (*d*) and a source of bit advancing pulses in the signal circuit connected to the last stage.

5. An electrical storage device having a shift register with a plurality of serial connected stages for storing binary coded bits and a signal circuit connected to each stage for advancing the coded bits from stage to stage, the improvement comprising
   (*a*) electrical delay means in the signal circuit for controlling the application of each bit advancing pulse to each succeeding with a negative time delay relative to the application of the pulse to the preceding stage.

6. In an electrical system having an adder with an input and an output and producing electrical signals at the output in response to and normally delayed in time with respect to electrical signals applied to the input and having a shift register including a plurality of serially connected storage stages each with an input and an output, the input of the first of said stages connected to the output of the adder and the output of the last of said stages connected to the input of the adder,
   (*a*) means for applying synchronous information shifting signals to the shift register stages comprising
   (*b*) a source of signals
   (*c*) and signal timing means connected to the source and to the stages and controlling the application of the signals to the stages in order from the first to the last with a negative time delay to compensate for delay in the adder.

7. In an electrical system having an adder with an input and an output and producing electrical signals at the output in response to and normally delayed in time with respect to electrical signals applied to the input and having a shift register including a plurality of serially connected storage stages each with an input and an output, the input of the first of said stages connected to the output of the adder and the output of the last of said stages connected to the input of the adder, (a) means for applying synchronous information shifting signals to the shift register stages comprising (b) a source of signals connected to the last stage (c) and electrical delay means connecting the source to each of the other stages for progressively increased delay in the application of the signals to the stages from the last to the first stage to compensate for delay in the adder.

8. In an electrical system having an electrical device with an input and an output and producing electrical signals at the output in response to and normally delayed in time with respect to electrical signals applied to the input and having a shift register including a plurality of serially connected storage stages each with an input and an output, the input of the first of said stages connected to the output of the electrical device and the output of the last of said stages connected to the input of the electrical device, (a) means for applying synchronous information shifting signals to the shift register stages comprising (b) a signal circuit connected to each stage, (c) and electrical delay means in the circuit for controlling the application of each information shifting signal to each succeeding stage with a negative time delay relative to the application of the signal to the preceding stage to compensate for delay in the adder.

References Cited in the file of this patent

UNITED STATES PATENTS 2,685,681 Tidball ---------------- Aug. 3, 1954

UNITED STATES PATENT OFFICE
CERTIFICATE OF CORRECTION

Patent No. 3,108,228 October 22, 1963

Genung L. Clapper

It is hereby certified that error appears in the above numbered patent requiring correction and that the said Letters Patent should read as corrected below.

Column 6, line 42, for "serial" read -- serially --.

Signed and sealed this 23rd day of June 1964.

(SEAL)
Attest:

ERNEST W. SWIDER
Attesting Officer

EDWARD J. BRENNER
Commissioner of Patents